United States Patent
Frick et al.

(12)

(10) Patent No.: US 6,553,421 B1
(45) Date of Patent: Apr. 22, 2003

(54) METHOD AND SYSTEM FOR BROADCAST MANAGEMENT IN A DATA COMMUNICATION NETWORK THAT PERMITS NAMESHARING

(75) Inventors: John Kevin Frick, Raleigh, NC (US); Daniel Dean Heimsoth, Cary, NC (US); Jon Michael Houghton, Raleigh, NC (US); Edward Joel Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,713

(22) Filed: Sep. 15, 1998

(51) Int. Cl.$^7$ .............................................. G06F 15/16

(52) U.S. Cl. ...................... 709/227; 709/228; 709/246; 370/401

(58) Field of Search ............................. 709/227, 228, 709/236, 303, 305, 249, 331, 105, 213, 226, 246, 220, 238, 245; 707/205; 713/151, 152, 153, 155; 370/397, 399, 400, 401, 409, 412, 431, 437, 433

(56) References Cited

U.S. PATENT DOCUMENTS

| | | | |
|---|---|---|---|
| 4,930,159 A | 5/1990 | Kravitz et al. ............... | 713/155 |
| 4,967,348 A | 10/1990 | Naito et al. .................. | 707/200 |
| 5,136,716 A | * 8/1992 | Harvey et al. ............... | 713/155 |
| 5,181,200 A | * 1/1993 | Harrison .................... | 370/85.1 |
| 5,434,914 A | * 7/1995 | Fraser ........................ | 379/219 |
| 5,454,078 A | 9/1995 | Heimsoth et al. ........... | 709/222 |
| 5,475,819 A | 12/1995 | Miller et al. ................ | 709/203 |
| 5,483,652 A | * 1/1996 | Sudama et al. .............. | 707/10 |
| 5,617,540 A | 4/1997 | Civanlar et al. ............ | 709/227 |

(List continued on next page.)

OTHER PUBLICATIONS

Microsoft WindowsNT Server, White Paper, Copyright, 1996.*

Microsoft Windows NT Server, System Operating System, White Paper, Mocrosoft Windows NT Server 4.0, Windows Internet Naming Service (WINS), Architecture and Capacity Planning, Copyright 1996.*

*Primary Examiner*—Mark Powell
*Assistant Examiner*—William C. Vaughn, Jr.
(74) *Attorney, Agent, or Firm*—Gerald R. Woods; Bracewell & Patterson, LLP

(57) ABSTRACT

A data communication network includes a network client, a network server, and a name caching entity located between the network client and the network server. The network server is coupled to the data communication network by a plurality of network adapters that each have a different network (e.g., Media Access Control (MAC)) address, but share a common logical name. The name caching entity includes a name cache, which stores the common logical name shared by the server's network adapters in association with the network address of one of the network adapters. By reference to the name cache, the name caching entity is able to convert broadcast frames to unicast frames, thereby advantageously reducing broadcast frames in the network. The name caching entity will disassociate the logical name and the network address in the name cache in response to a failure to detect a frame indicating the establishment of a session with the network server within a selected interval of transmission of a frame requesting establishment of a session with the network server. In this manner, the network client can establish a session with the network server through another network adapter in cases in which the network adapter whose network address is stored in the name cache cannot support an additional session.

22 Claims, 4 Drawing Sheets

U.S. PATENT DOCUMENTS

| | | | | |
|---|---|---|---|---|
| 5,636,210 A | * | 6/1997 | Agrawal | 370/390 |
| 5,701,462 A | * | 12/1997 | Whitney et al. | 707/10 |
| 5,729,689 A | * | 3/1998 | Allard et al. | 709/228 |
| 5,734,718 A | | 3/1998 | Prafullchandra | 713/183 |
| 5,842,214 A | * | 11/1998 | Whitney et al. | 707/10 |
| 5,884,043 A | * | 3/1999 | Teplitsky | 709/238 |
| 5,905,873 A | * | 5/1999 | Hartmann | 709/249 |
| 5,983,270 A | * | 11/1999 | Abraham et al. | 709/224 |
| 5,991,777 A | * | 11/1999 | Momoh et al. | 707/205 |
| 5,995,999 A | * | 11/1999 | Bharadhwaj | 709/200 |
| 6,006,272 A | * | 12/1999 | Aravamudan et al. | 709/220 |
| 6,047,002 A | * | 4/2000 | Hartmann et al. | 370/466 |
| 6,047,332 A | * | 4/2000 | Viswanathan et al. | 709/245 |
| 6,052,788 A | * | 4/2000 | Wesinger et al. | 709/227 |
| 6,055,574 A | * | 4/2000 | Smorodinsky et al. | 709/226 |
| 6,088,728 A | * | 7/2000 | Bellemore et al. | 709/227 |
| 6,088,738 A | * | 7/2000 | Okada | 709/245 |
| 6,098,111 A | * | 8/2000 | Maegawa et al. | 709/300 |
| 6,105,151 A | * | 8/2000 | Mahalingam et al. | 714/48 |
| 6,157,927 A | * | 12/2000 | Jenkins et al. | 707/10 |
| 6,170,012 B1 | * | 1/2001 | Coss et al. | 709/229 |
| 6,178,455 B1 | * | 1/2001 | Schutte et al. | 709/226 |
| 6,198,747 B1 | * | 3/2001 | Bingham et al. | 370/401 |
| 6,243,759 B1 | * | 6/2001 | Boden et al. | 709/238 |
| 6,272,113 B1 | * | 8/2001 | McIntyre et al. | 370/248 |
| 6,289,017 B1 | * | 9/2001 | Shani et al. | 370/395 |
| 6,295,518 B1 | * | 9/2001 | McLain et al. | 703/23 |

* cited by examiner

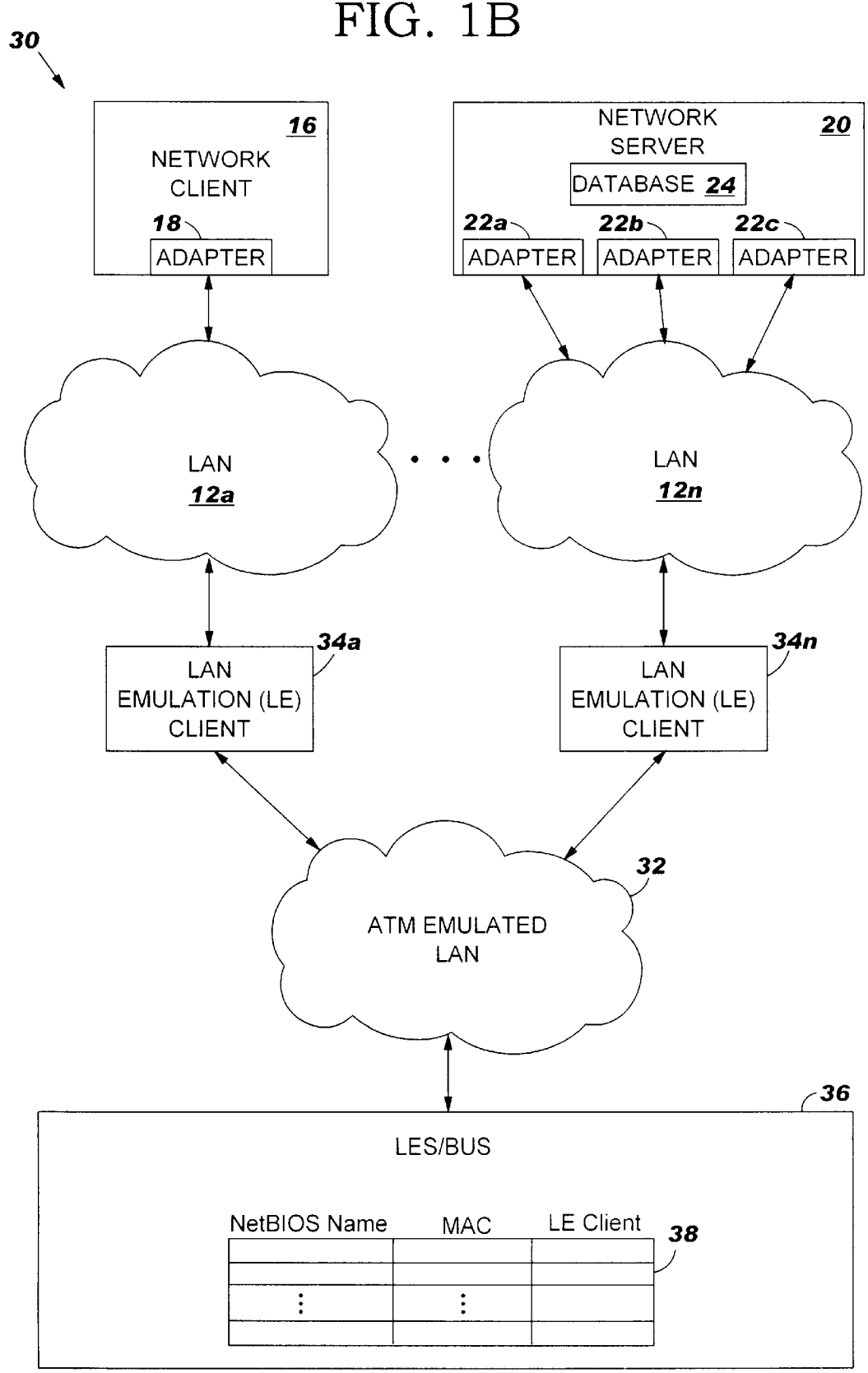

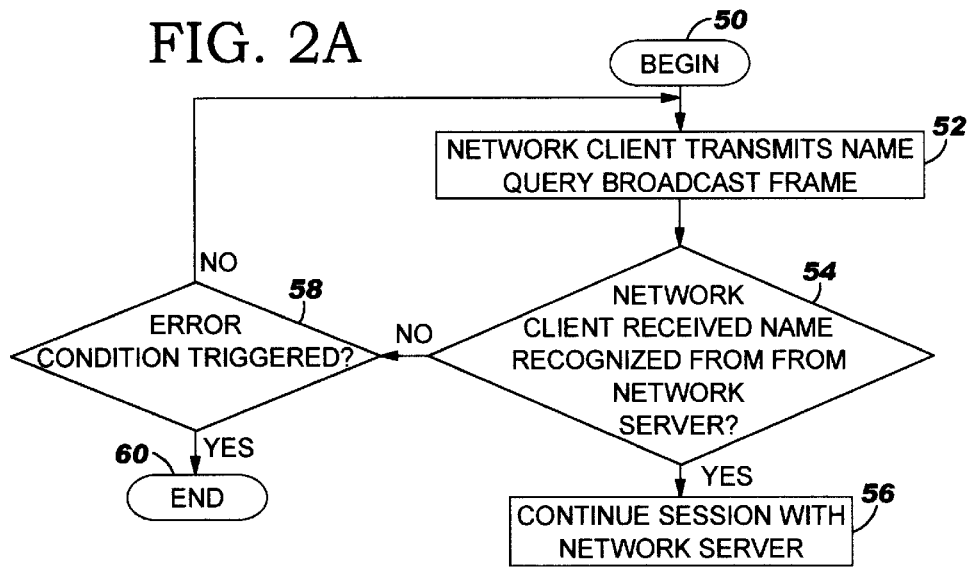
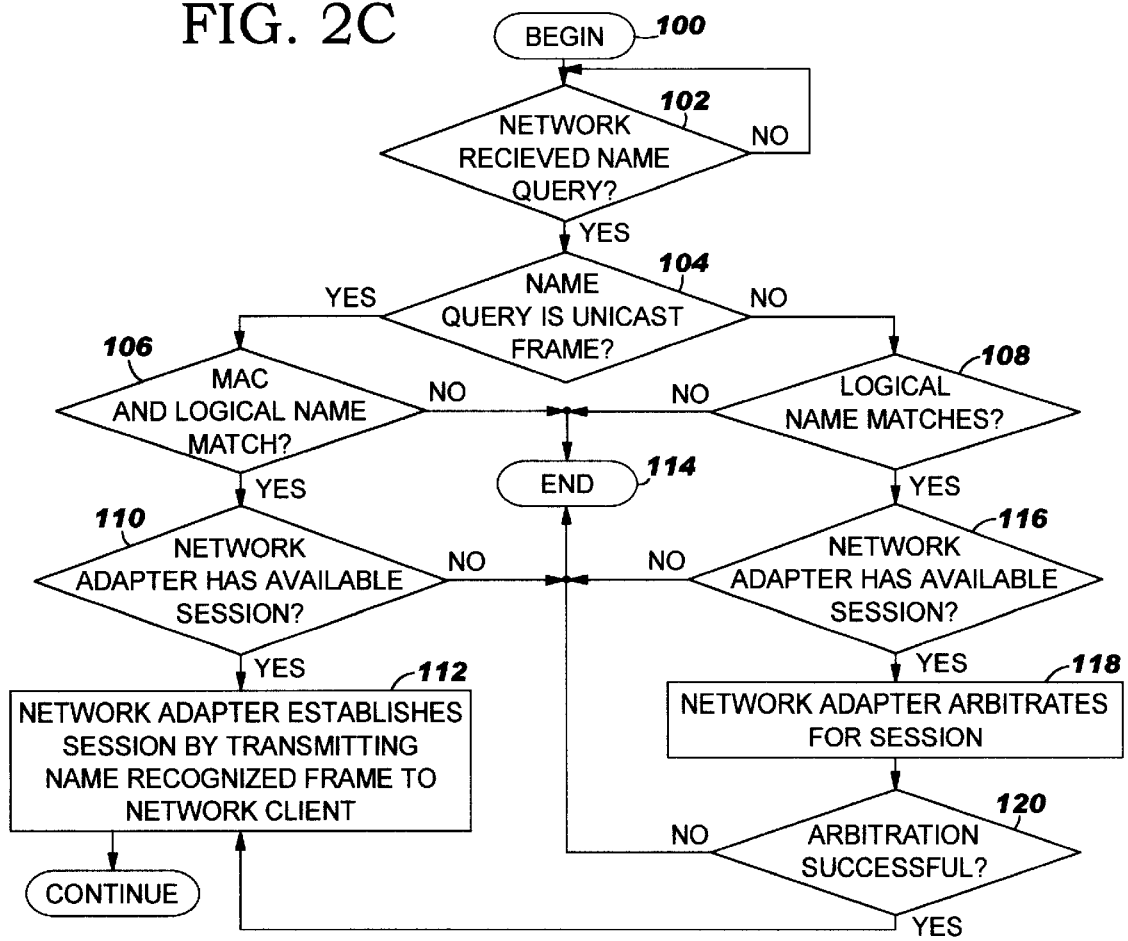

METHOD AND SYSTEM FOR BROADCAST MANAGEMENT IN A DATA COMMUNICATION NETWORK THAT PERMITS NAMESHARING

BACKGROUND OF THE INVENTION

1. Technical Field

The present invention relates in general to data communication networks and in particular to namesharing between multiple network adapters in a bridged network environment. Still more particularly, the present invention relates to a method and system for broadcast management in a bridged network environment that permits namesharing by multiple network adapters.

2. Description of the Related Art

In a computer network such as a conventional local area network (LAN) or a wide area network (WAN), communication between computers can be conceptualized using the International Organization for Standardization Open Systems Interconnection (ISO/OSI) model, which provides a multi-layered architecture that standardizes levels of service and defines types of interactions for computers engaged in communication across the computer network. Above the lowest, physical layer (Layer 1) of the ISO/OSI model is the data-link layer (Layer 2), which is principally concerned with the coding, addressing, and transmission of data between computers. Within the many common network topologies (e.g., token ring, token bus) falling within the set of IEEE 802 standards, the data-link layer of the ISO/OSI model conveys a network address known as a media access control (MAC) address that is unique for each device within a bridged network.

Because MAC addresses are simply binary numbers, they are inconvenient for network users and designers to use. Accordingly, it is frequently the case that logical alphanumeric names are supported by higher layers of the ISO/OSI model. For example, in networks that implement the network layer (Layer 3) of the ISO/OSI model with NetBIOS (Network Basic Input/Output System), 16-byte alphanumeric names are supported. Originally, as discussed in U.S. Pat. No. 4,930,159 to Kravitz et al., NetBIOS names were required to be unique within each bridged network to ensure proper authentication of attached devices. Later networks, however, such as that disclosed by U.S. Pat. No. 5,454,078 to Heimsoth et al., permitted NetBIOS names to be shared between network adapters, which advantageously resulted in greater distribution of network workload among network adapters.

The present invention includes a recognition that it would be desirable to implement broadcast management techniques in networks that permit namesharing between network adapters within the same bridged network. For example, some currently available networking products implement "name caching," whereby a name caching entity caches the NetBIOS name and MAC address of each network adapter detected in a traditional LAN (e.g., Ethernet or Token Ring) or asynchronous transfer mode (ATM) emulated LAN. When a broadcast frame for a cached NetBIOS name is received by a name caching entity, the name caching entity converts the broadcast frame into a unicast frame using the MAC address associated with the NetBIOS name contained in the broadcast frame. In this manner, the number of broadcast frames in the network is advantageously reduced. While the present invention recognizes that it would be desirable to seamlessly implement both nameshar-ing and broadcast management techniques such as name caching, the concurrent use of both enhancements in a bridged network environment is not currently feasible since name caching permits only a single MAC address to be cached with each NetBIOS name. The present invention is therefore directed to the interoperability of broadcast management techniques (in particular, name caching) and namesharing in a bridged network environment.

SUMMARY OF THE INVENTION

In accordance with the present invention, a data communication network includes a network client, a network server, and a name caching entity located between the network client and the network server. The network server is coupled to the data communication network by a plurality of network adapters that each have a different network (e.g., MAC) address, but share a common logical name. The name caching entity includes a name cache, which stores the common logical name shared by the server's network adapters in association with the network address of one of the network adapters. By referring to the name cache, the name caching entity is able to convert broadcast frames to unicast frames, thereby advantageously reducing broadcast frames in the network. Failure to detect a frame indicating the establishment of a session with the network server within a selected interval of transmission of a frame requesting establishment of a session with the network server will cause the name caching entity to disassociate the logical name and the network address in the name cache. In this manner, the network client can establish a session with the network server through another network adapter in cases in which the network adapter whose network address is stored in the name cache cannot support an additional session.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1B depicts a second exemplary embodiment of a data communication network in which the present invention may advantageously be utilized;

FIG. 2A is a high level logical flowchart of an illustrative embodiment of a process by which a network client may establish a session with a network server in one of the exemplary data communication networks shown in FIGS. 1A and 1B;

FIG. 2C is a high level logical flowchart of an illustrative embodiment of a process by which the network adapter of a network server determines whether to establish a session with a network client in one of the exemplary data communication networks shown in FIGS. 1A and 1B.

DETAILED DESCRIPTION OF PREFERRED EMBODIMENT

Figure 1A:
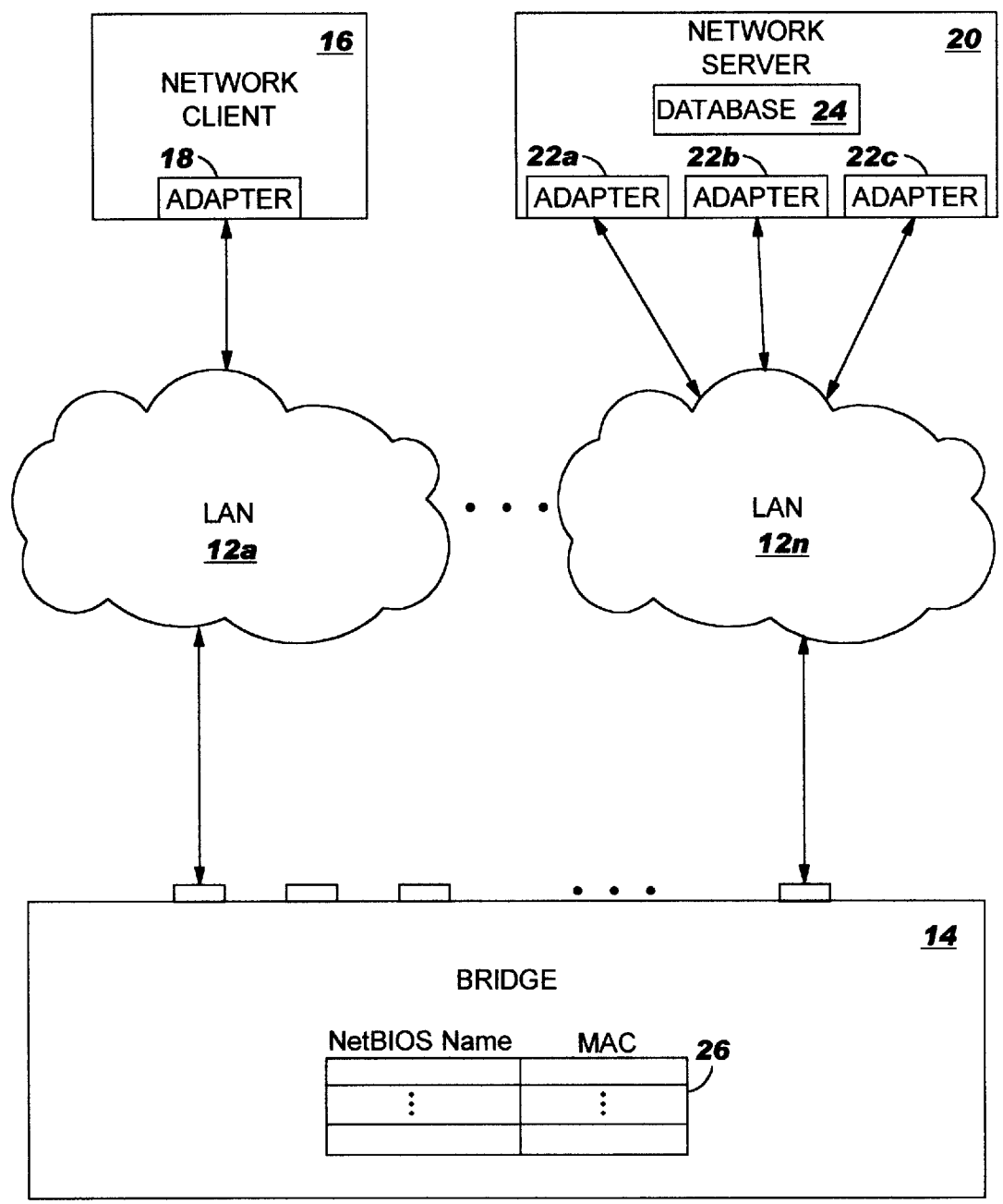
FIG. 1A illustrates a first exemplary embodiment of a data communication network in which the present invention may advantageously be utilized.

With reference now to the figures and in particular with reference to FIG. 1A, there is illustrated a first exemplary embodiment of a data communication network in which the present invention may advantageously be utilized. As depicted, data communication network 10 includes a plurality of local area networks (LANs) 12a–12n, which are coupled together by a multi-port bridge 14. LANs 12 may each be implemented utilizing any of a number of network topologies and protocols, including without limitation token ring, token bus, ethernet, and ATM (Asynchronous Transfer Mode). As shown, there is at least one network client 16 (e.g., a desktop or workstation computer) attached to LAN 12a by a network adapter 18, and a network server 20 attached to LAN 12n by multiple network adapters 22a, 22b, and 22c. Network adapters 18 and 22a–22c are each identified by a respective MAC address that is unique throughout data communication network 10. Although network adapters 22a–22c are illustrated as all attached to a single LAN 12n, it should be understood that network adapters 22a–22c could alternatively be attached to different LANs that are plugged into different ports of bridge 14.

Each of network adapters 22a–22c preferably supports a large number (e.g., 254) of sessions in order to permit numerous network clients to access database 24 and/or other resources of network server 20. If each network adapter 22 were assigned a unique logical (e.g., NetBIOS) name, sessions with network clients could possibly become concentrated on one or two of network adapters 22, leading to a situation where a network client specifying a particular logical name would be unsuccessful in establishing a session with network server 20 even though at least one network adapter 22 still had unused capacity. Accordingly, as discussed above with respect to U.S. Pat. No. 5,454,078 to Heimsoth et al., which is incorporated herein by reference, the workload is preferably balanced between network adapters 22a–22c of network server 20 by assigning network adapters 22a–22c a single logical name.

Data communication network 10 is further enhanced by implementing bridge 14 as a name caching entity. Thus, as discussed above, when bridge 14 first receives a frame specifying a particular logical name and MAC address as a destination, bridge 14 temporarily stores the logical name and MAC address pair in its name cache 26. When bridge 14 subsequently receives a broadcast frame targeting a logical name stored within name cache 26, bridge 14 converts the broadcast frame into a unicast frame and delivers the frame to only the appropriate LAN 12 rather than all LANs 12.

Referring now to FIG. 1B, there is illustrated a second illustrative embodiment of a data communication network, which in accordance with the present invention, implements both name sharing and name caching. As indicated by like reference numerals, data communication network 30 of FIG. 1B includes a network client 16, network server 20, and LANs 12a–12n as described above. However, instead of being coupled together by a multi-port bridge, each of LANs 12a–12n is coupled to an asynchronous transfer mode (ATM) emulated LAN 32 through a respective LAN emulation (LE) client 34. As will be understood by those skilled in the art, ATM emulated LAN 32 is a packet-switched network that emulates the operation of a conventional LAN (e.g., a Token Ring or Ethernet network) by providing a service interface identical to the LAN being emulated while actually conducting the underlying communication utilizing the ATM protocol.

LE clients 34 operate in ATM emulated LAN 32 under the control of LAN emulation server/broadcast and unknown server (LES/BUS) 36. As shown, LES/BUS 36 contains a name cache 38 in which LES/BUS 36 stores the MAC address and NetBIOS name of each detected LAN entity in association with the ATM protocol address of the LE client 34 supporting the LAN entity. LES/BUS 36 can utilize name cache 38 to convert LAN broadcasts into unicasts by inserting into the broadcast packet the MAC address stored within name cache 38 in association with the NetBIOS name specified in the broadcast packet. LES/BUS 36 can also direct the unicast frame to the one LE client 34 stored within name cache 38.

Figure 2B:
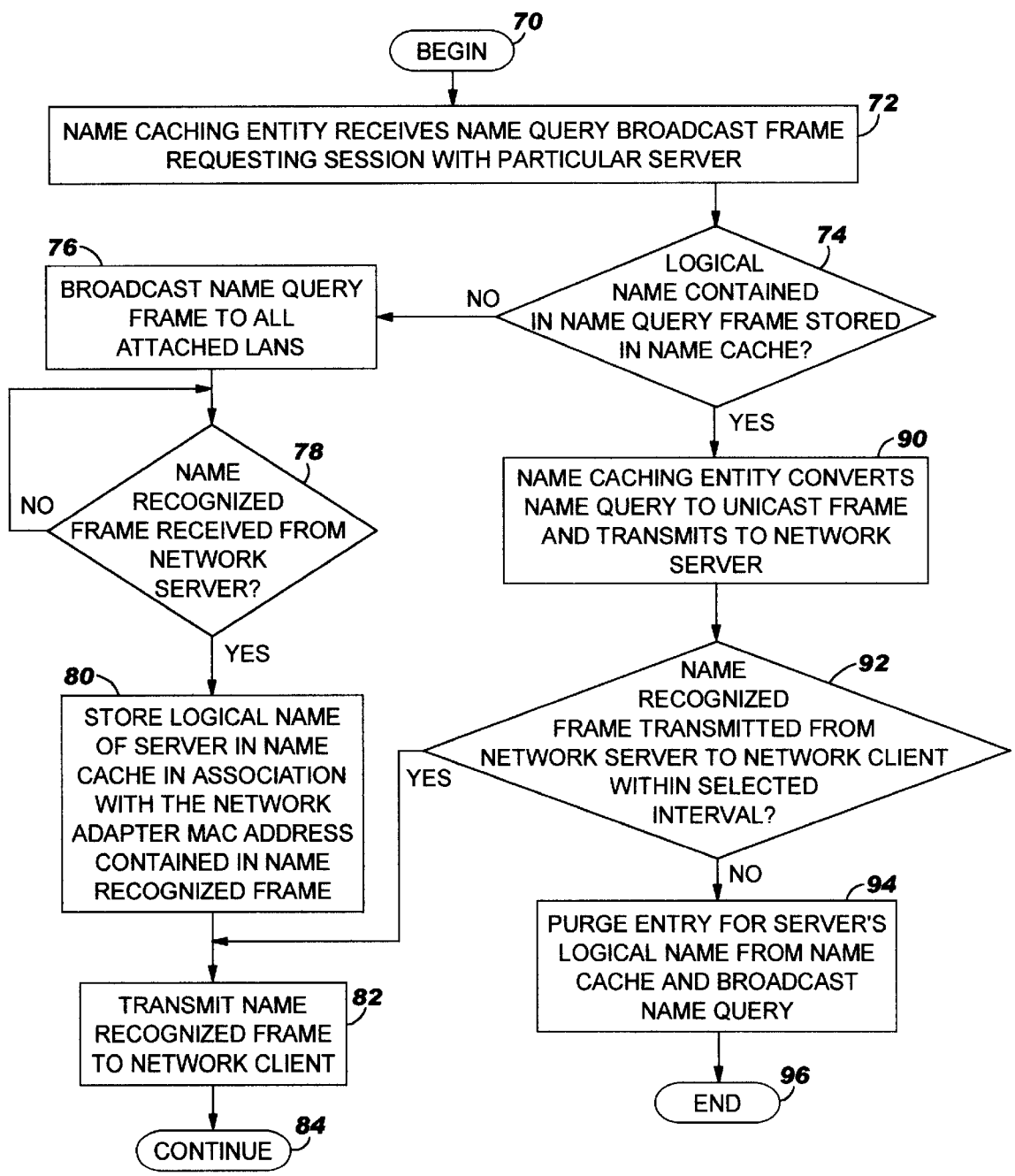
FIG. 2B is a high level logical flowchart of an illustrative embodiment of a process by which a name caching entity, such as a bridge, LAN switch or LAN emulation server/broadcast and unknown server (LES/BUS), participates in the establishment of a session between a network client and a network server.

With reference now to FIGS. 2A–2C, there are depicted high level logical flowcharts that together illustrate a process by which a network client may establish a session with a network server in data communication network in accordance with the present invention. FIG. 2A illustrates the process from the perspective of network client 16, FIG. 2B illustrates the process from the perspective of the name caching entity, and FIG. 2C illustrates the process from the perspective of network server 20. Although the flowcharts depicted in FIGS. 2A–2C are hereafter described with respect to the data communication network shown in FIG. 1A, it should be understood that the flowcharts are equally applicable to other network topologies and name caching entities, such as ATM emulated LAN and LES/BUS shown in FIG. 1B.

Referring first to FIG. 2A, the process begins at block 50 and thereafter proceeds to block 52, which illustrates network client 16 initiating the establishment of a session with network server 20 by transmitting a broadcast frame called a Name Query that specifies the logical name shared by network adapters 22a–22c. The process then passes to block 54, which depicts a determination by network client 16 of whether or not network client 16 has received a unicast Name Recognized frame from network server 20, indicating that a session has been established. The Name Recognized frame, if received, specifies a session ID by which future frames in the session will be identified. If a Name Recognized frame has been received by network client 16 within a selected time period (e.g., 0.5 seconds) of transmitting the Name Query frame, the process proceeds to block 56, which represents network client 16 continuing the session by transmitting unicast frames to network server 20. If, on the other hand, a Name Recognized frame has not been received by network client 16 within the selected time period, the process passes to block 58, which illustrates a determination if an error condition has been triggered, for example, due to network client 16 transmitting a threshold number of unanswered Name Query broadcast frames. If an error condition has been triggered by the failure to receive a Name Recognized frame, the process shown in FIG. 2A terminates at block 60 with network client 16 reporting an error condition. Otherwise, the process returns to block 52, which illustrates network client 16 again transmitting a Name Query broadcast frame.

Referring to FIG. 2B, the participation of bridge 14 in the establishment of a session between network client 16 and network server 20 will now be described. As depicted, the process begins at block 70 and then passes to block 72, which illustrates bridge 14 receiving the Name Query frame broadcast by network client 16. In response to receipt of the Name Query frame, bridge 14 then determines at block 74 whether or not the logical name specified in the Name Query is stored in name cache 26. If not, the process passes to block 76, which illustrates bridge 14 broadcasting the Name Query on each of LANs 12a–12n with the exception of the LAN 12 attached to the incoming bridge port. The process then passes to block 78, which depicts bridge 14 waiting to receive a Name Recognized frame from network server 20. Once a Name Recognized frame has been received from network server 20, bridge 14 stores the MAC address from the Name Recognized frame in name cache 26 in association with the logical name of network adapters 22, as shown at block 80, and then transmits the Name Recognized frame to network client 16, as depicted at block 82. Thereafter, as illustrated at block 84, bridge 14 continues to deliver unicast frames in the session between network client 16 and network server 20 using the MAC address contained in the frames.

Referring again to block 74, in response to a determination that the logical name specified in a Name Query frame received from network client 16 is stored in name cache 26, the process passes to block 90. Block 90 depicts bridge 14 converting the Name Query from a broadcast frame to a unicast frame by inserting into the frame the MAC address stored in association with the logical name in name cache 26. Bridge 14 then transmits the unicast frame to network server 20 on LAN 12n. Next, as depicted at block 92, bridge 14 determines if a Name Recognized frame has been received from network server 20 in response to the unicast Name Query frame within a selected interval (e.g., one second) of the transmission of the Name Query frame.

The determination illustrated at block 92 can be made in a number of ways. A relatively simple but resource-intensive way for bridge 14 to time the interval between transmission of a Name Query frame and receipt of a Name Recognized frame is to establish a separate timer for each entry in name cache 26. Alternatively and preferably, bridge 14 can leverage the known retry behavior of network client 16 to time the interval between transmission of a Name Query frame and receipt of a Name Recognized frame. In this embodiment, each entry in name cache 26 has an associated "suspect name sharing" flag and timestamp field. When bridge 14 first receives a broadcast Name Query frame specifying a logical name stored in name cache 26, bridge 14 sets the associated flag and records a timestamp indicating the time bridge 14 transmits the unicast Name Query frame. As discussed above with respect to block 54 of FIG. 2A, if network client 16 does not receive a Name Recognized frame within a half second interval of transmitting the Name Query broadcast frame, network client 16 will retransmit a Name Query broadcast frame. In response to the retry, bridge 14 will check the "suspect name sharing" flag associated with the logical name specified in the Name Query. Because the flag is set, bridge 14 does not record a new timestamp, but instead checks if one second has elapsed between the current time and when the timestamp was recorded. Because the first retry will be within the one second interval, bridge 14 simply converts the Name Query from a broadcast frame to a unicast frame and transmits the unicast frame, as discussed above. If subsequent retries are received, bridge 14 will eventually determine by reference to the timestamp that more than one second has elapsed since transmission of the first unicast Name Query. Bridge 14 will reset the flag upon receipt of a Name Recognized frame.

Still referring to block 92, in response to a determination that a Name Recognized frame has been received by bridge 14 within the selected interval, session establishment is successful, and the process passes to block 82, which has been described. If, on the other hand, bridge 14 determines at block 92 that a Name Recognized frame has not been received within the selected interval, one of several scenarios may have occurred. For example, the logical name may have been disassociated with network adapters 22 or network server 20 may have been detached from LAN 12n. In either of these cases, bridge 14 deletes the entry for the logical name of network server 20 from name cache 26 as shown at block 94 since network server 20 may no longer be accessible via that logical name and MAC address on LAN 12n. Alternatively, and more centrally to the present invention, the logical name specified in name cache 26 may be associated with the MAC address of one of network adapters 22 that has no available sessions. However, it may be that another of adapters 22a–22c has an available session. Thus, as shown at block 94, the entry that associates the logical name shared by network adapters 22 with the MAC address of the "full" network adapter is purged from name cache 26 in this case also, and bridge 14 broadcasts the Name Query on all of LANs 12a–12n except the one attached to the incoming bridge port. Thereafter, the process terminates at block 96. In this manner, when a network client 16 again transmits a Name Query frame specifying the shared logical name of network adapters 22a–22c, as illustrated in FIG. 2A by the process passing from block 58 to block 52, no entry for the shared logical name of network adapters 22a–22c will be found in name cache 26 at block 74 of FIG. 2B, and bridge 14 will broadcast the Name Query on all of LANs 12a–12n except the one attached to the incoming bridge port, as discussed above with respect to block 76. One of network adapters 22a–22c having available sessions can then respond with a Name Recognized frame, thereby establishing a session with network client 16.

With reference now to FIG. 2C, the participation of one of network adapters 22a–22c of network server 20 in the establishment of a session with network client 16 will now be described. As depicted, the process begins at block 100 and thereafter proceeds to block 102, which illustrates a determination of whether or not the network adapter (assume it to be network adapter 22a) has received a Name Query frame. If not the process iterates at block 102 until a Name Query frame is received. In response to receipt of a Name Query frame, the process passes to block 104. If the Name Query frame is a unicast frame, meaning it contains a unique MAC address, the process proceeds from block 104 to block 106, which illustrates network adapter 22a determining if the MAC address and logical name specified in the Name Query frame matches its MAC address and logical name. If the MAC address and logical name do not match, the process terminates at block 114. If, however, the MAC address and logical name specified in the Name Query frame match the MAC address and logical name of network adapter 22a, network adapter 22a determines if it has an available session, as depicted at block 110. If not, the process terminates at block 114. If network adapter 22a does have an available session (i.e., less than 254 sessions are active), the process proceeds to block 112, which illustrates network adapter 22a establishing a session by transmitting a Name Recognized frame to network client 16 via bridge 14 and thereafter continuing the session.

Returning to block 104 of FIG. 2C, if the Name Query frame is a broadcast frame rather than a unicast frame, the process passes to block 108. Block 108 depicts network adapter 22a determining whether the logical name specified in the Name Query broadcast frame matches the logical name shared by network adapters 22a–22c. If not, the process terminates at block 114. If, however, the logical name in the Name Query matches the logical name shared by network adapters 22, network adapter 22a determines if it has a available session, as shown at block 116. If network adapter 22a has no available sessions, the process simply terminates at block 114. If, on the other hand, network adapter 22a has an available session, network adapter 22a then arbitrates with network adapters 22b and 22c for the session at block 118. Network server 20 may assign the session to a network adapter 22 having an available session using any arbitration scheme, such as round-robin, random, or priority-based. If network adapter 22a arbitrates successfully, the process passes from block 118 to block 120 and then to block 112, which has been described. However, if network adapter 22a arbitrates unsuccessfully, the process passes through block 120 and terminates at block 116. In this case, a session will be established between network client 16 and network server 20 through one of network adapters 22b and 22c.

As has been described, the present invention provides a mechanism by which broadcast management techniques such as name caching can be seamlessly implemented in a data communication network in conjunction with name sharing. While the invention has been particularly shown and described with reference to a preferred embodiment, it will be understood by those skilled in the art that various changes in form and detail may be made therein without departing from the spirit and scope of the invention. For example, although the present invention has been illustrated and described with respect to illustrative embodiments in which name caching in implemented in a bridge and a LES/BUS, it should be understood that the present invention is equally applicable to other name caching and broadcast management entities, such as LAN switches.

What is claimed is:

1. A name caching entity for use within a data communication network, said name caching entity comprising:
   a name cache;
   means for storing in said name cache a logical name of a network entity in association with a network address of said network entity;
   means for converting broadcast frames to unicast frames by reference to said name cache;
   wherein said means for converting frames includes means, responsive to receipt of a broadcast frame specifying a logical name, for searching said name cache for said logical name; and
   means, responsive to locating said logical name in said name cache, for inserting a network address associated with said logical name by said name cache into said broadcast frame to convert said broadcast frame into a unicast frame; and
   means for disassociating said logical name and said network address in said name cache in response to a failure to detect a frame indicating the establishment of a session with said network entity within a selected interval of transmission of a frame requesting establishment of a session with said network entity.

2. The name caching entity of claim 1, wherein said means for storing comprises means for storing in said name cache a logical name of a network entity in association with a network address of said network entity in response to receipt of a frame requesting establishment of a session with said network entity.

3. The name caching entity of claim 1, said name cache including at least one entry, wherein each entry in said name cache contains a logical name of a network entity and only a single network address.

4. The name caching entity of claim 1, wherein said name caching entity is a bridge.

5. The name caching entity of claim 1, wherein said name caching entity is a local area network (LAN) switch.

6. The name caching entity of claim 1, wherein said data communication network comprises an asynchronous transfer mode (ATM) emulated local are network (LAN) and said name caching entity is a LAN emulation server and broadcast and unknown server (LES/BUS).

7. A data communication network, comprising
   a network client;
   a network server coupled to said data communication network by a plurality of network adapters sharing a common logical name, said plurality of network adapters each having a different network address;
   a name caching entity located between said network client and said network server, said name caching entity including;
   a name cache;
   means for storing in said name cache said common logical name in association with a network address of one of said plurality of network adapters;
   means for converting broadcast frames to unicast frames by reference to said name cache;
   wherein said means for converting frames includes, means, responsive to receipt of a broadcast frame specifying a logical name, for searching said name cache for said logical name; and means, responsive to locating said logical name in said name cache, for inserting a network address associated with said logical name by said name cache into said broadcast frame to convert said broadcast frame into a unicast frame; and
   means for disassociating said logical name and said network address in said name cache in response to a failure to detect a frame indicating the establishment of a session with said network server within a selected interval of transmission of a frame requesting establishment of a session with said network server.

8. The data communication network of claim 7, wherein said means for storing comprises means for storing in said name cache a logical name of a network entity in association with a network address of said network entity in response to receipt of a frame requesting establishment of a session with said network entity.

9. The data communication network of claim 7, said name cache including at least one entry, wherein each entry in said name cache contains a logical name of a network entity and only a single network address.

10. The data communication network of claim 7, wherein said name caching entity is a bridge.

11. The data communication network of claim 7, wherein said name caching entity is a local area network (LAN) switch.

12. The data communication network of claim 7, wherein said data communication network comprises an asynchronous transfer mode (ATM) emulated local area network (LAN) and said name caching entity is a LAN emulation server and broadcast and unknown server (LES/BUS).

13. A method for establishing a session between a network client and a network server in a data communication network, wherein said network server is attached to said data communication network by a plurality of network adapters that each have a different network address and share a common logical name, said method comprising:
   storing, in a name cache, the logical name shared by said plurality of network adapters in association with a network address of one of said plurality of network adapters;

in response to receipt of a broadcast frame from said network client requesting establishment of a session with said network server, converting said broadcast frame to a unicast frame by reference to said name cache and transmitting said unicast frame to said network server;

in response to receipt, within a selected interval, of a response frame from said network server indicating establishment of a session, transmitting said response frame to said network client; and in response to a failure to receive a response frame within said selected interval, disassociating said logical name and said network address in said name cache.

14. The method of claim 13, wherein said storing step comprises storing in said name cache said logical name in association with said network address in response to receipt of a frame containing said logical name and said network address.

15. The method of claim 13, said storing step comprising storing said logical name in association with only a single network address.

16. The method of claim 13, where said disassociating step comprises purging said logical name from said name cache.

17. A program product for establishing a session between a network client and a network server in a data communication network, wherein said network server is attached to said data communication network by a plurality of network adapters that each have a different network address and share a common logical name, said program product comprising:

a computer usable medium; and instructions encoded within said computer usable medium, said instructions including:

instruction means for storing, in a name cache, the logical name shared by said plurality of network adapters in association with a network address of one of said plurality of network adapters;

instruction means, responsive to receipt of a broadcast frame from said network client requesting establishment of a session with said network server, for converting said broadcast frame to a unicast frame by reference to said name cache and transmitting said unicast frame to said network server;

instruction means, responsive to receipt, within a selected interval, of a response frame from said network server indicating establishment of a session, for transmitting said response frame to said network client; and instruction means, responsive to a failure to receive a response frame within said selected interval, for disassociating said logical name and said network address in said name cache.

18. The program product of claim 17, wherein said instruction means for storing comprises instruction means for storing in said name cache said logical name in association with said network address in response to receipt of a frame containing said logical name and said network address.

19. The program product of claim 17, said instruction means for storing comprising instruction means for storing said logical name in association with only a single network address.

20. The program product of claim 17, said instruction means for disassociating comprising instruction means for purging said logical name from said name cache.

21. The name caching entity of claim 1, wherein:

said means for converting comprises means for converting a broadcast frame requesting establishment of a session into a unicast frame;

said name caching entity further comprises means for transmitting said unicast frame to a network entity to request establishment of a session; and said means for disassociating comprises means for disassociating said logical name and said network address in said name cache in response to a failure to receive a response frame from said network entity within said selected interval indicating establishment of a session.

22. The data communication network of claim 7, wherein:

said means for converting comprises means for converting a broadcast frame requesting establishment of a session into a unicast frame;

said name caching entity further comprises means for transmitting said unicast frame to the network server to request establishment of a session; and said means for disassociating comprises means for disassociating said logical name and said network address in said name cache in response to a failure to receive a response frame from said network server within said selected interval indicating establishment of a session.

* * * * *